May 18, 1937.  E. H. SPERBERG  2,080,443
INTERMITTENT MOVEMENT
Filed Feb. 1, 1935
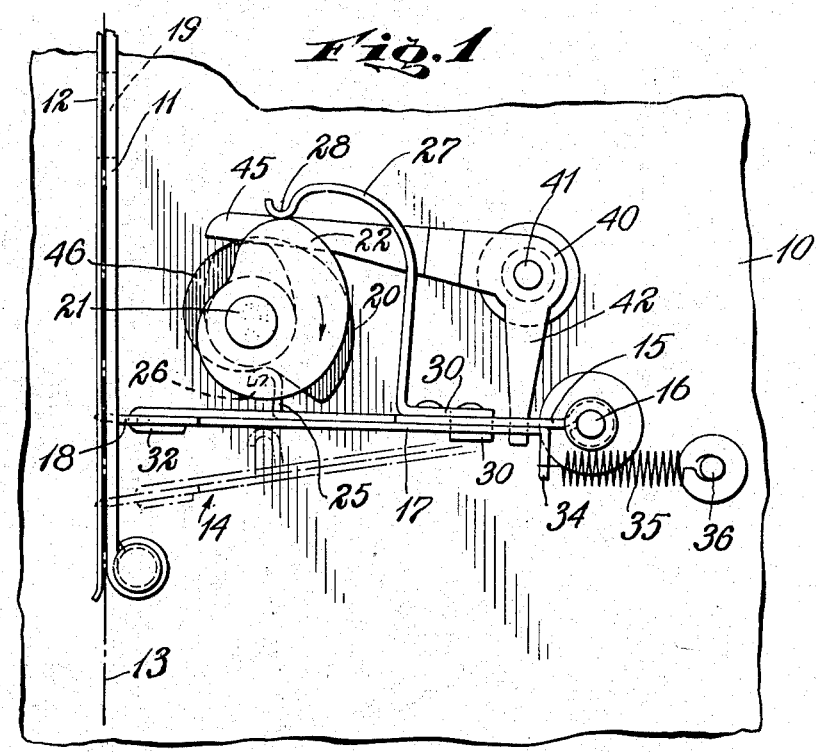
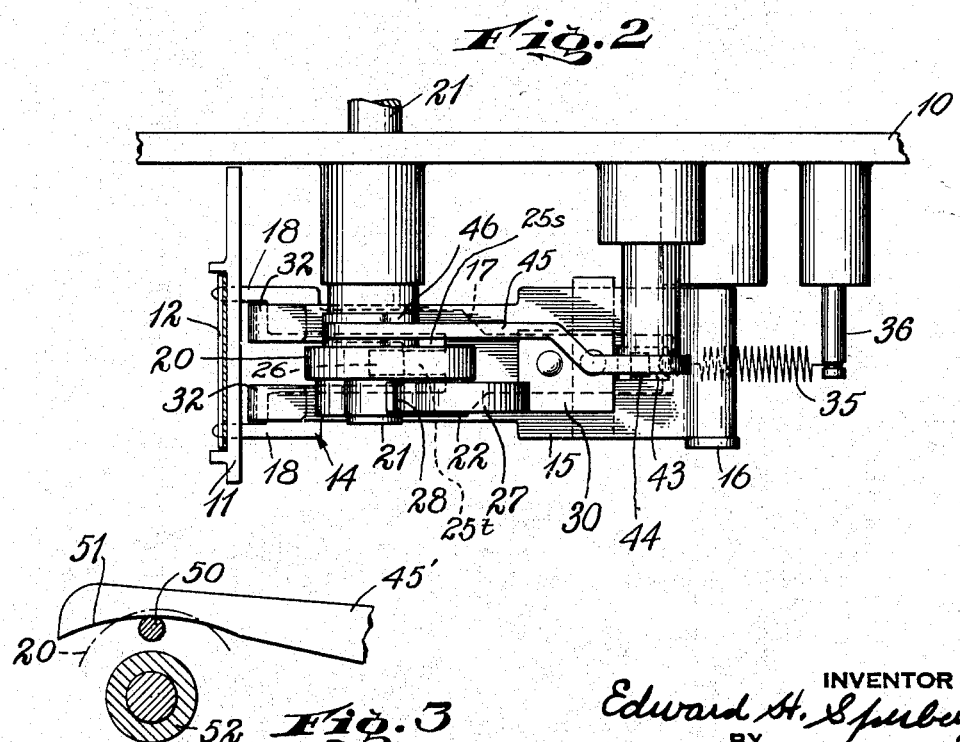
INVENTOR
Edward H. Sperberg
BY
Warren D. Foster
ATTORNEY Patented May 18, 1937

2,080,443

UNITED STATES PATENT OFFICE 2,080,443

INTERMITTENT MOVEMENT

Edward H. Sperberg, Chicago, Ill.

Application February 1, 1935, Serial No. 4,573

11 Claims. (Cl. 88—18.4)

The present invention relates generally to motion picture apparatus and more particularly to intermittent feeding movements for such apparatus.

It is an object of the present invention to provide an improved high speed intermittent movement for motion picture apparatus employing usual perforated film.

As is well understood in the art, the projection of so-called motion pictures from an intermittently moving film requires that the beam of light which is passed through the film be cut off, generally by a revolving shutter, while the film is actually moving. Also, in order that such obscuration of the image does not become visible to the beholder in the form of flicker, it is also necessary to add to the so-called "cut-off" blade of the shutter other and generally smaller "flicker" blades to balance the "cut-off" blade. The total extent of all of such obscuring blades is obviously in direct proportion to the amount of time which is consumed by the film while in motion. Consequently the longer the period of motion, the greater the amount of obscuration and resultant light loss. In order to minimize such light loss, inventors for many years have endeavored to perfect so-called rapid intermittent movements in which the ratio of movement to rest is small and the light loss from shutter operation correspondingly reduced.

In such movements as constructed in the past, several faults have been common. First, such movements have been expensive to construct. Second, they have damaged the film by imposing severe shock strains thereon because of their extreme rapidity in the initial and concluding portions of each film movement. Third, they have been noisy, particularly when wear has appeared.

A primary object of the present invention is to provide a very rapid movement—illustrated as of the ratio known as 12 to 1—which avoids all of the above and other difficulties, and on the contrary is inexpensive, does not damage the film, and is quiet, all as will appear in the following portion of this specification.

For intermittently moving the teeth of a claw member with the rapidity necessary to obtain a high speed feeding or advancement of the film, revoluble means operating on the principle of a box cam have been widely used, such box cams eliminating the springs which are necessary to hold a cam follower in contact with the external work faces of an ordinary revoluble cam part during its operation. Such box cams also tend to secure quiet operation, since the cam and the follower are always necessarily in engagement, with no chance that the cam follower will leave the fast revolving cam work faces and be returned thereagainst to produce clicking or slapping noises. As is well known to those skilled in the construction of cams, however, the manufacturing costs of accurate box cams are usually relatively high compared to the manufacturing costs of heart cams, for example, having external work faces. Another object of the present invention is to provide an inexpensive cam driven intermittent movement for a film handling apparatus which employs revoluble cams having external work faces and cooperating cam followers so arranged as to secure the desirable results of a box cam mechanism.

A further object of the present invention is to provide in a motion picture apparatus a simple, inexpensive, intermittent movement having film engaging teeth which move into engagement with the film along a substantially rectilinear path of travel.

A feature of the present invention resides in the provision of a carriage pivotally mounted at one side of the film path to be reciprocated along the film path and a tooth-carrying member slidable upon said carriage for engagement with and disengagement from the film.

Another purpose of the present invention is to provide an intermittent movement in which the cam follower or followers are themselves resilient so that, without the use of additional springs, they hug the faces of the cams with which they cooperate. Such an arrangement is particularly useful after wear begins to appear. In movements previously constructed, coil springs have been used to hold the follower against the face of the cam. Under certain conditions, such an arrangement, although it requires two parts instead of one, as in the present invention may be satisfactory, but at high speed difficulties have developed. For example, such springs have worked well in a four-to-one movement, but have not been efficient at eight-to-one.

Other features and advantages will appear as the description proceeds.

It will of course be understood that I am showing one form only of my invention solely for purposes of illustration. Changes may be made therein without departing from the spirit of my invention or the scope of my broader claims.

In the drawing:

Figure 1 is a side view, broken away in part, of a motion picture apparatus having my invention applied thereto.

Figure 2 is a partial top view of the structure of Figure 1.

Figure 3 is a diagrammatic view, shown partly in section, illustrating a portion of the cam structure of Figure 1.

For purposes of illustration my invention as embodied in a movement which I show may be mounted in a film handling apparatus on one side of an upright mounting plate or frame 10. On one face of this plate may be fastened a fixed gate section 11 constructed in a well known way for cooperation with a movable gate section 12 yieldingly urged against the fixed gate section by any well known means (not shown). For feeding a conventional perforated film 13 intermittently through the gate, a claw device generally designated as 14 may include a body or carriage member 15 pivoted on a shoulder stud 16 rigidly fastened in the plate 10 at a distance from the film path which is preferably several times the height of a single advance of the film at one side of the gate section 11.

A reciprocable member 17 is slidably mounted on the carriage 15 for movement toward and away from the film path and has on its forward end two teeth or fingers 18 which can be made integral with the member 17, if desired. The movement of the teeth 18 into the usual perforations of the film 13, according to the disclosure of Figure 1, is along a substantially rectilinear path of travel. By lengthening the claw device 14 and positioning the pivot member 16 farther from the film path an approximate rectilinear path of travel of the teeth 18, away from the film path, may be had, if desired. It will of course be understood that the reciprocable member 17 may be arranged with only one tooth, or with more than two teeth. Means presently to be described are provided for guiding the reciprocable member 17 on the carriage 15.

For moving the carriage 15 and toothed member 17 up and down with respect to the film gate so as to give a very rapid advancing movement to the film 13 and a relatively long stationary exposure period at an aperture 19 in the gate section 11, an inexpensive, advantageous arrangement of cams and associated cam followers is provided. A cam 20 is mounted on a shaft 21 disposed transversely to the carriage 15 and the plate 10 in which it may be journalled by a source of power (not shown). A cam 22 is also mounted on the shaft 21 and is rigidly secured to the cam 20 in an angular relation thereto which will presently appear. The cams 20 and 22 may be made of suitable metal in well known ways or these cams may be molded, in one piece from suitable material, preferably a synthetic resin such as bakelite and have suitable contours with re-entrant portions as shown in the drawing for cooperation with convexly curved cam follower portions.

To provide an operative connection between the claw device 14 and the cams 20 and 22 for giving the desired up-and-down intermittent movement to the claw device, a cam follower 25 is fastened rigidly to the carriage. A cam contacting portion 26 angularly disposed relatively to the main supporting or body portion, extends upwardly toward the cam 20 and terminates in a rounded surface arranged for engagement against the edge or work face of the cam 20 (see Figure 1). The follower 25 may be joined to the carriage 15 by means of a tongue-like portion 25t separated on its sides from the body of the carriage 15 by open slots 25s. By this construction, the desired resilience can be secured for the follower 25. Another cam follower 27 is fastened rigidly to the carriage in the rear of the cam follower 25, i. e. nearer the pivot 16, and extends upwardly past the top of the cam 22 and is bent downwardly to terminate in a rounded portion 28 arranged for engagement against the edge of the cam 22. It can be readily seen by those skilled in the art that if desired rollers may be mounted on the cam followers 25 and 27 to take the place of the rounded portions 26 and 28.

It will be understood from inspection of Figure 1 that the contour of the cam 20 and the shape and positioning of the cam follower member 25 are such that only the rounded portion 26 of the cam follower 25 ever comes into contact with the cam 20. Likewise, the contour of the cam 22 and the shape and positioning of the cam follower 27 are such that only the rounded portion 28 of the cam follower ever comes into contact with the cam 22. This advantageous arrangement not only makes for reduction in friction, but also makes it possible to provide small areas of hardened wearing surfaces for the curved portions 26 and 28 while permitting the followers 25 and 27 to be made of a relatively soft resilient material which is suitable to be economically shaped by a punch press operation. Hardened wearing surfaces of the curved portions may be provided by well known case hardening operations, or by securing a thin sheathing or plating of suitable hard material, such as chromium, to the outer surfaces of the curved portions 26 and 28.

The cam followers 25 and 27 may be made integral with the carriage 15 or they may be made of separate pieces of considerable stiffness and yet have a small amount of resilience so that they can function to take up their own wear and that of the work faces of the cams 20 and 22. They may be rigidly fastened to the carriage by suitable means such as riveting. As shown in Figure 1, the carriage 15 may have a transversely disposed portion 30 bent downwardly and then parallel to the carriage 17. A forward guiding means for the slidable member 17 may be formed by bending two fork-like portions 32 of the carriage rearwardly to be disposed beneath forwardly disposed offset portions 33 of the member 17. The carriage portions 30 also serve as stop means for the teeth 18.

A rear end portion 34 of the slidable toothed member 17 may be bent downwardly and an extensible spring 35 may have one end fastened to said bent portion 34 and the other end fastened to a stud 36 fastened to the frame 10. The spring 35 normally urges the teeth 18 away from the film path.

For moving the teeth 18 into usual perforations in the film 13, a bell crank lever device 40 is provided and is pivoted on a stud 41 fastened in the plate 10. A depending arm 42 extends downwardly and passes through an elongated slot 43 in the carriage 15 to engage in a slightly over-sized slot 44 in the slidable member 17. A forwardly extending arm 45 of the bell crank 40 is bent to lie alongside the cam 20 and is constructed for engagement with a cam 46 mounted on the same shaft 21 which carries cams 20 and 22. The cam 46 may be made of suitable material and be rigidly fastened to the cam 20, or the cams 20, 22 and 46 may be molded as one piece from metal of suitable material such as a synthetic resin such as bakelite.

The cams 20 and 22 are each preferably so contoured and so positioned, one relative to the other, and the cam followers 25 and 27 are so constructed and arranged that when the cams are revolved in the direction of the arrow the teeth 18 are moved from the uppermost starting position, shown in full line in Figure 1, to their lowermost position (indicated in dot and dash) in one-twelfth of a complete revolution of shaft 21 on which the cams 20 and 22 are mounted. This arrangement leaves eleven-twelfths of the time of one revolution of the shaft 21 for the remaining portions of the work cycle of the teeth 18. Any other desired ratio may be employed by changing the contour of the cams.

The cam 46 and the cam follower arm 45 of the bell crank 40 are preferably arranged so that the teeth 18 begin and complete the advance of the film at a slow speed. Also, the teeth are caused to remain entirely motionless or immobile for a short period after they reach the lower limit of their travel and before the withdrawal of the teeth from the perforations of the film begins. This arrangement is advantageous, since it reduces the starting strain on the film and positively prevents the momentum of the fast moving film causing the film to be advanced even a very minute amount beyond operative relation to the aperture 19. A further benefit resulting from the relatively small portion of a complete revolution of the cam 20 being used for moving the teeth 18 downwardly is that ample time is left for moving the teeth 18 upwardly and then leftwardly as viewed in the drawing at a relatively slow speed into the next perforations in the film after the end of the above mentioned period of immobility of the teeth 18 while engaging the film 13.

As a result of the above described arrangement, it will be seen that certain causes of film damage common to the rapid movements are absent from one constructed according to my invention. The delayed removal of the fingers from the perforations overcomes any excess momentum of the film and prevents improper alignment of the teeth upon their next stroke into the following perforation or perforations. That is to say, the film is stopped at the proper point so that the ends of the fingers thereafter may move into the perforations at the center thereof. If the film tended to advance slightly beyond the proper point of arrest, the next thrust of the fingers would obviously tend to injure the film. The slow withdrawal and re-insertion of the fingers minimizes the danger of the edge of the tooth injuring the periphery of the perforation, as does the approximately right angled relation of the finger to the perforation upon withdrawal and the substantially right angled relation upon re-insertion. Such arrangement has great advantages over movements of the so-called skip-stop type in which the fingers move at constant and very high speed, upon withdrawal and insertion as well as upon operative movement.

According to a further feature of my invention, the cam engaging surfaces of the curved portions 26 and 28 are held in substantially fixed relation, one to the other, and the work surfaces of the cams 20 and 22 are so disposed relatively to each other and to the positioning of the curved portions 26 and 28 that the cooperation of the cams 20 and 22 with the cam followers 25 and 27 is substantially equivalent to that of a single box cam and a single cam follower for such a box cam. In other words, the cam followers 25 and 27 are always in such engagement with the cams 20 and 22 respectively on opposite sides of the shaft 21 that the carriage 15 can only be moved by operation of the cams 20 and 22. It will be noted that the spring 35 does not affect the movement of the carriage 15, and is effective for moving only the toothed member 15 a short distance in a direction away from the film. This movement is relatively slow.

Some of the advantages of obtaining the equivalent action of a box cam by using the cams 20 and 22 with external work faces will be readily seen by those skilled in the art. Other of such advantages are the elimination of springs, quietness of operation, low manufacturing costs, accessibility of the work faces of the cams, and ease of repair and replacement of the parts.

In Figure 3, there is illustrated an alternative structure which may replace the cam 46 and cam follower arm 45 of Figures 1 and 2. A pin 50 may be firmly secured in the side of the cam 20 to project inwardly therefrom—i. e., toward the mounting frame 10. And the cam follower drive 45′ may be arranged with a cam follower work face 51 for engagement with the pin 50 in a way that the arm 45′ is raised and without noise or abruptness. As the pin 50 moves clockwise, the arm 45′ will be lowered by action of the spring 35 and will ride for a time on a circular hub portion 52 which may be integrally joined to the cam 20.

Certain of the advantages of my invention are disclosed above in the foregoing description. Another advantage resides in the provision of a film movement of the intermittent crip type which can be constructed to occupy but little space in a motion picture apparatus. Other advantages arise from the provision of an intermittent movement made up of parts of simple design which can be inexpensively produced and assembled in volume. Still other advantages arise from the construction of an intermittent film feeding movement in which only one simple spring is used and such spring is arranged so that it needs to move a part only a short distance, and at a relatively slow speed.

I claim:

1. In an intermittent film feeding movement for a motion picture apparatus, in combination, a claw device having a body extending away from the film path and being pivoted at one side of the film path, a first upwardly extending cam follower rigidly fastened on said body, a revoluble cam disposed above said body for engagement with said follower, a second cam follower rigidly mounted on said body and extending upwardly and terminating in a downwardly bent portion, a second revoluble cam coaxial with said first cam and arranged for engagement with said bent portion of said second follower, means for revolving said cams, said followers and the faces of said cams being so formed and disposed that upon the revolution of said cams said followers move said claw device in a plane generally parallel to the path of the film, teeth slidably mounted upon said claw device, and means for moving said teeth into and out of the plane of the film path in accordance with the up and down movement of said claw device.

2. In an intermittent film feeding movement, in combination, a claw device including a toothed member extending away from the film path and a support for said toothed member, said toothed member being slidable on said support toward and away from the film path, said support being pivotally mounted for upward and downward movement, a first cam follower rigidly secured to said support and extending upwardly therefrom, a revoluble cam disposed above said support for engagement with said cam follower, a second cam follower rigidly secured to said support and extending upwardly therefrom and terminating in a downwardly bent portion, a second revoluble cam coaxial with said first cam arranged for engagement with said second cam follower, means for revolving said cams thereby moving said followers, and means for moving said toothed member into and out of engagement with the film in time with the movement of said claw device by said cams.

3. In an intermittent film feeding movement, in combination, a claw device including a toothed member extending away from the film path, a support for said toothed member, said toothed member being slidable on said support toward and away from the film path, said support being pivotally mounted for upward and downward movement, a first cam follower rigidly secured to said support and extending upwardly therefrom, a revoluble cam disposed above said support for engagement with said cam follower, a second cam follower rigidly secured to said support and extending upwardly therefrom and terminating in a downwardly bent portion, a second revoluble cam coaxial with said first cam arranged for engagement with said second cam follower, means for revolving said cams, thereby moving said followers, and means for moving said toothed member into and out of engagement with the film in accordance with the movement of said claw device by said cams, said last named means including a third cam coaxial with said first and second cams and a connection between said third cam and said slidable toothed member for operatively moving said toothed member.

4. In an intermittent film feeding movement, in combination, a toothed member extending away from the film path and means for moving said toothed member up and down along the film path, said moving means including a cam device having external cam surfaces including re-entrant portions, a movably mounted support, said toothed member being movably mounted on said support, and two cam followers for said device mounted on said support in rigid relation one to the other, and means connecting said cam followers and said toothed member for moving the latter in accordance with the movement of said cam followers, said cam followers each having a convexly curved cam contacting surface arranged for cooperation with said re-entrant portions of said cam device, said cam followers and said cam device being so shaped that they necessarily are always held in engagement, whereby their coaction is equivalent to that of a box cam having a single cam follower.

5. In an intermittent feeding movement, in combination, a toothed claw device extending away from the film path, means for moving said toothed device up and down along the film path, and means for moving the teeth of said claw device into and out of the film path, said first named moving means including a cam device having external work faces including re-entrant portions, means for revolving said cam device, two cam follower members mounted on said claw device on one side of said cam device in fixed relation, one to the other, said cam followers each having a convexly curved cam contacting surface arranged for cooperation with said re-entrant portions of said work faces of said cam device, the construction of said cam followers and said cam device being such that they are necessarily always in engagement so that their co-action is equivalent to that of a box cam having a single cam follower and the construction of said claw device and said cam followers being such that the movement of the teeth thereof into and out of the film path is without effect on the fixed relation of said cam followers.

6. In an intermittent film feeding movement for film feeding apparatus, in combination, a carriage pivoted at one side of the film path and extending therefrom to a point adjacent the film path, means including a revoluble cam for reciprocating said carriage up and down along the film path, a tooth-carrying member slidably mounted on said carriage for movement of the teeth of said member alternately across and out of the film path, and means for so moving said teeth and into and out of engagement with the film, said teeth moving means including a bell-crank lever device having one arm operatively connected to said tooth carrying member and another arm arranged with a cam follower portion disposed in adjacent relation to the side of said cam, and a pin projecting from said side of said cam so as to engage said cam follower portion when said cam revolves.

7. An intermittent feeding movement for a perforated film, said movement including a carriage pivoted at one side of the film path a distance exceeding twice a single intermittent advance of the film, said carriage extending from its pivot toward the film path at an approximate right angle thereto, a member slidably mounted on said carriage for movement toward and away from the film path, said member having teeth for insertion in the perforations of the film, a revoluble shaft disposed above said carriage transversely thereto, a first cam fixed on said shaft, a second cam fixed on said shaft, means for revolving said cams, a first upwardly extending cam follower rigidly secured on said carriage and arranged for engagement with said first cam, a second cam follower rigidly secured on said carriage and extending upwardly past said second cam on the side toward the pivot of said carriage, said second cam follower having a portion bent downwardly and toward said second cam for engagement therewith, said cam followers being held in fixed relation, one to the other, a spring arranged for urging said teeth out of engagement with the film, and means for moving said teeth into engagement with the film, said last named means including a bell crank pivoted above said carriage having a downwardly extending arm engaging said carriage, said bell crank having another arm extending forwardly over said shaft, and a third cam on said shaft for engaging the second named arm of said bell crank, said third cam and said cooperating arm being disposed for moving said teeth into the perforations of the film prior to the movement of said carriage downwardly by said first cam, said third cam and said cooperating arm being arranged for moving said toothed member out of engagement with the film a predetermined time after the advance of the film has ceased and said second cam becomes operative to raise said carriage to starting position, each of said cam followers always being in such engagement with its associated cam that said carriage is always positively controlled by said first and second cams.

8. In an intermittent film movement, in combination, a claw device including a carriage reciprocable along the film path, a revoluble shaft disposed transversely to said carriage, a first cam fixed on said shaft and arranged with external work faces, a second cam having external work faces and being mounted on said shaft in a fixed angular relation to said first cam, means for revolving said cams, and an operative connection between said cams and said claw device for reciprocating the latter in a predetermined manner and in a direction substantially parallel to the path of movement of the film, said connection including a first cam follower fixed on said claw device for operatively engaging said first cam, and a second cam follower fixed on said claw device and arranged for operative engagement with said second cam at a point which is adjacent the opposite side of said shaft from the point of engagement of said first cam and its cam follower, said cam followers being formed with body portions which have sufficient resilience to take up their own wear and the wear on the work faces of said cams and with rounded terminal portions which engage said such faces.

9. In an intermittent film movement, in combination, a claw device including a carriage reciprocable along the film path, a revoluble shaft disposed transversely to said carriage, a first cam fixed on said shaft and arranged with external work faces, a second cam having external work faces and being mounted on said shaft in a fixed angular relation to said first cam, means for revolving said cams, and an operative connection between said cams and said claw device for reciprocating the latter in a predetermined manner and in a direction substantially parallel to the path of movement of the film, said connection including a first cam follower fixed on said claw device for operatively engaging said first cam, and a second cam follower fixed on said claw device and arranged for operatively engaging said second cam at a point on the opposite side of said shaft from the point of engagement of said first cam and its cam follower, said cam followers being formed with body portions which have sufficient resilience to take up their own wear and the wear on the work faces of said cams and with rounded terminal portions which engage said such faces, said cam followers being constructed to have a sufficient stiffness and said cams being correlatively positioned so that the coaction of said cams and said cam followers is substantially equivalent to that of a box cam and its follower.

10. In an intermittent film movement, in combination, a slidable tooth-bearing member, an integral carriage structure for supporting and moving said tooth-bearing member, said carriage structure comprising a body portion, two cam follower portions extending from said body portion, and a guiding portion extending from said body portion and engaging said tooth-bearing member for supporting and directing it in its sliding movement, a plurality of cams which cooperate with said cam follower portions to impart a to-and-fro asymmetrically timed movement to said carriage in one plane, a bell crank lever engaging said tooth-bearing member to slide said tooth-bearing member along said carriage member in a plane substantially at right angles to said first plane, and means to rock said lever.

11. In an intermittent film movement, in combination, a slidable tooth-bearing member, a substantially flat carriage member for supporting and guiding said tooth-bearing member, said carriage member being disposed with the plane of its flat side parallel to the axis of said shaft, a plurality of cams revoluble with said shaft, a first cam follower having a supporting portion extending from said carriage member in a direction normal to said flat side and terminating in a portion engaging one of said cams at a point on one side of said shaft, a second cam follower having a supporting portion extending from said carriage member in said direction and having a portion engaging another of said cams at a point on the opposite side of said shaft from that upon which said engaging portion of said first cam follower engages its cam, said supporting portion of said second cam follower being shaped to clear the portion of its cam between its point of engagement with its cam and said carriage, said cams through said followers being effective to impart an asymmetrically timed movement to said carriage, and means for sliding said tooth-bearing member upon said carriage.

EDWARD H. SPERBERG.